(12) United States Patent
Moniz et al.

(10) Patent No.: US 7,997,085 B2
(45) Date of Patent: Aug. 16, 2011

(54) GAS TURBINE ENGINE ASSEMBLY AND METHOD OF ASSEMBLING SAME

(75) Inventors: Thomas Ory Moniz, Loveland, OH (US); Paul Cooker, Cincinnati, OH (US); Robert Joseph Orlando, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1022 days.

(21) Appl. No.: 11/535,597

(22) Filed: Sep. 27, 2006

(65) Prior Publication Data

US 2008/0072568 A1 Mar. 27, 2008

(51) Int. Cl.
F02C 7/275 (2006.01)
F02C 7/22 (2006.01)
F02C 7/26 (2006.01)

(52) U.S. Cl. ............................... 60/788; 60/786; 60/778

(58) Field of Classification Search .................... 60/786, 60/788, 778, 226.1, 262, 268, 39.162
See application file for complete search history.

(56) References Cited

U.S. PATENT DOCUMENTS

| 3,617,762 A | 11/1971 | Price |
| 4,330,743 A | 5/1982 | Glennon |
| 4,475,075 A | 10/1984 | Munn |
| 4,743,776 A | 5/1988 | Baehler et al. |
| 5,074,109 A * | 12/1991 | Mandet et al. ................. 60/792 |
| 5,349,814 A * | 9/1994 | Ciokajlo et al. ............. 60/226.1 |
| 5,899,411 A | 5/1999 | Latos et al. |
| 6,351,090 B1 | 2/2002 | Boyer et al. |
| 6,672,049 B2 * | 1/2004 | Franchet et al. ............. 60/226.1 |
| 7,117,683 B2 | 10/2006 | Thompson |
| 7,131,275 B2 | 11/2006 | Gustafson |
| 7,418,821 B2 * | 9/2008 | Butt ................................ 60/778 |
| 7,481,062 B2 * | 1/2009 | Gaines et al. ................... 60/792 |
| 2004/0150232 A1 | 8/2004 | Xu et al. |
| 2005/0279102 A1 * | 12/2005 | O'Connor ....................... 60/778 |
| 2006/0042252 A1 * | 3/2006 | Derouineau .................... 60/703 |
| 2006/0168968 A1 | 8/2006 | Zielinski et al. |
| 2006/0254253 A1 * | 11/2006 | Herlihy et al. ............. 60/39.162 |
| 2007/0267540 A1 * | 11/2007 | Atkey et al. ..................... 244/58 |
| 2008/0006023 A1 * | 1/2008 | Lardellier .................... 60/226.1 |
| 2008/0250792 A1 * | 10/2008 | Wang et al. ..................... 60/806 |

* cited by examiner

*Primary Examiner* — Ehud Gartenberg
*Assistant Examiner* — Young Choi
(74) *Attorney, Agent, or Firm* — David J. Clement, Esq.; Armstrong Teasdale LLP

(57) ABSTRACT

A method for assembling a gas turbine engine including a core gas turbine engine, a low-pressure turbine, a starter, and a generator is provided. The method includes coupling a starter to the core gas turbine engine, and coupling a generator to the low-pressure turbine.

16 Claims, 5 Drawing Sheets

GAS TURBINE ENGINE ASSEMBLY AND METHOD OF ASSEMBLING SAME

BACKGROUND OF THE INVENTION

This invention relates generally to gas turbine engines, and more specifically to a system configured to start the gas turbine engine and also configured to generate electrical power.

At least some known gas turbine engines used with aircraft include a core engine having, in serial flow arrangement, a compressor which compresses airflow entering the engine, a combustor which burns a mixture of fuel and air, and low and high pressure turbines which extract energy from airflow discharged from the combustor to generate thrust.

As aircraft accessory power demands have increased, there also has been an increased need to run the gas turbine engines at idle speeds that may be higher than other engines not subjected to increased power demands. More specifically, increasing the gas turbine engine idle speed enables the increased power demands to be met without sacrificing compressor stall margins. However, the increased idle speed may also generate thrust levels for the engine which are higher than desired for both flight idle decent operations and/or during ground idle operations. Over time, continued operation with increased thrust levels during such idle operations may increase maintenance costs and the increased fuel flow requirements may also increase aircraft operating expenses.

BRIEF SUMMARY OF THE INVENTION

In one aspect, a method for assembling a gas turbine engine including a core gas turbine engine, a low-pressure turbine, a starter, and a generator is provided. The method includes coupling a starter to the core gas turbine engine, and coupling a generator to the low-pressure turbine.

In another aspect, a starter/generator system for a gas turbine engine is provided. The system includes a starter coupled to a core gas turbine engine, and a generator coupled to a low-pressure turbine.

In a further aspect, a gas turbine engine assembly is provided. The gas turbine engine assembly includes a core gas turbine engine, a low-pressure turbine, and a starter/generator system that includes a starter coupled to the core gas turbine engine, and a generator coupled to the low-pressure turbine.

DETAILED DESCRIPTION OF THE INVENTION

Figure 1:
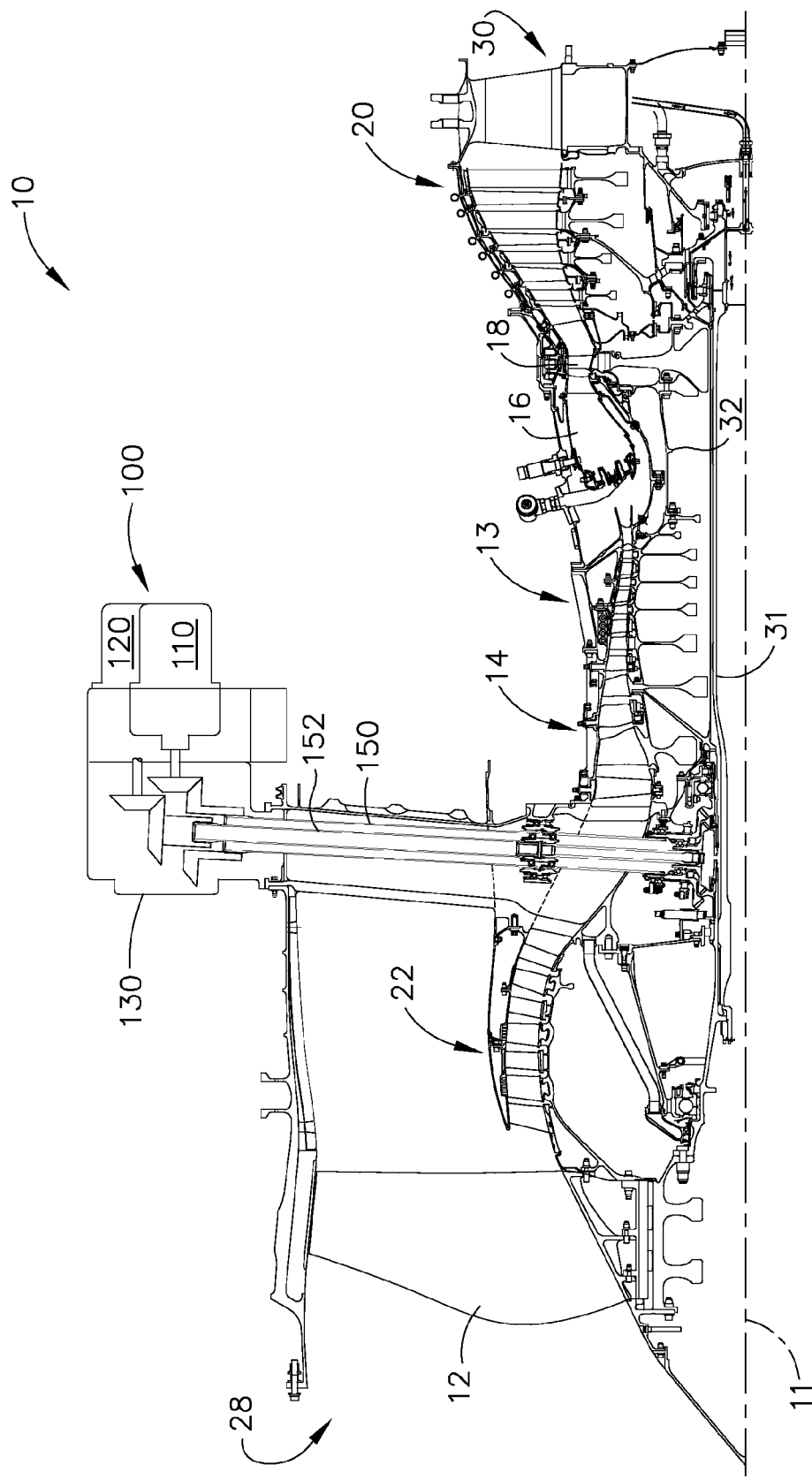
FIG. 1 is a simplified schematic illustration of a gas turbine engine assembly including an exemplary starter/generator system.
Figure 2:
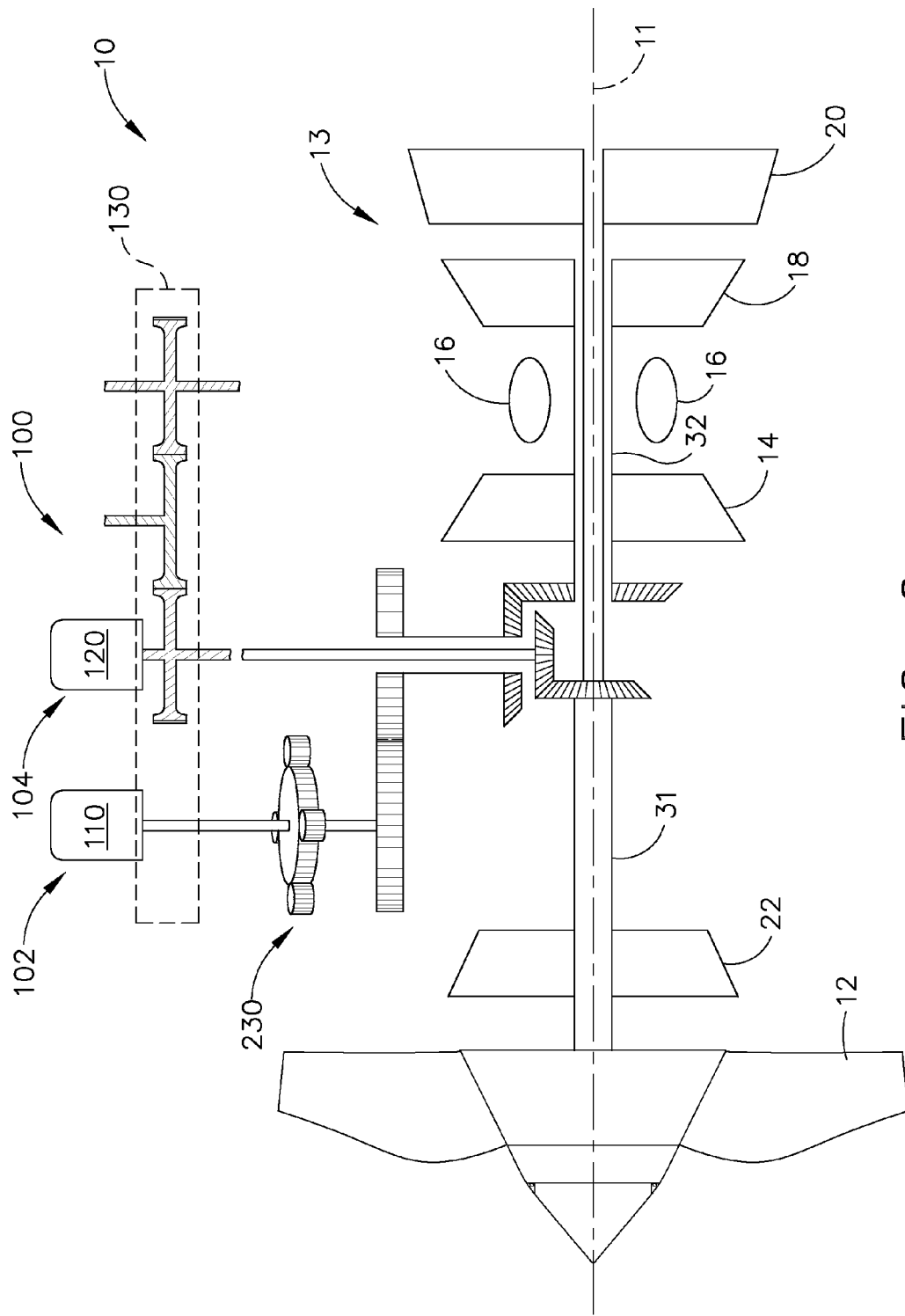
FIG. 2 is a simplified schematic illustration of the gas turbine engine assembly and starter/generator system shown in FIG. 1.

FIG. 1 is a cross-sectional view of a gas turbine engine assembly 10 having a longitudinal axis 11. FIG. 2 is a simplified schematic illustration of gas turbine engine assembly 10 shown in FIG. 1. Gas turbine engine assembly 10 includes a fan assembly 12 and a core gas turbine engine 13. Core gas turbine engine 13 includes a high pressure compressor 14, a combustor 16, and a high pressure turbine 18. In the exemplary embodiment, gas turbine engine assembly 10 also includes a low pressure turbine 20, and a multi-stage booster compressor 22. Gas turbine engine assembly 10 has an intake side 28 and an exhaust side 30. Fan assembly 12, booster 22, and low-pressure turbine 20 are coupled together by a first rotor shaft 31, and compressor 14 and high-pressure turbine 18 are coupled together by a second rotor shaft 32.

In operation, air flows through fan assembly 12 and a first portion of the airflow is channeled through booster 22. The compressed air that is discharged from booster 22 is channeled through compressor 14 wherein the airflow is further compressed and delivered to combustor 16. Hot products of combustion (not shown) from combustor 16 are utilized to drive turbines 18 and 20, and turbine 20 is utilized to drive fan assembly 12 and booster 22 by way of shaft 31. Gas turbine engine assembly 10 is operable at a range of operating conditions between design operating conditions and off-design operating conditions.

Gas turbine engine assembly 10 also includes a starter/generator system 100 that includes a starter 102 and a generator 104. Although starter 102 is described herein as a device that is utilized to start the core gas turbine engine 13, it should be realized, that starter 102 may also be driven by the core gas turbine engine 13 and function as a generator. Moreover, although generator 104 is described herein as an apparatus that is driven by low-pressure turbine 20 to generate electrical energy, it should be realized, that generator 104 may also drive low-pressure turbine 20 to facilitate restarting gas turbine engine assembly 10 during various operational conditions which will be discussed below. Gas turbine engine assembly 10 also includes a motor/generator 110, a generator/motor 120, and an accessory gearbox 130 that are discussed below.

Figure 3:
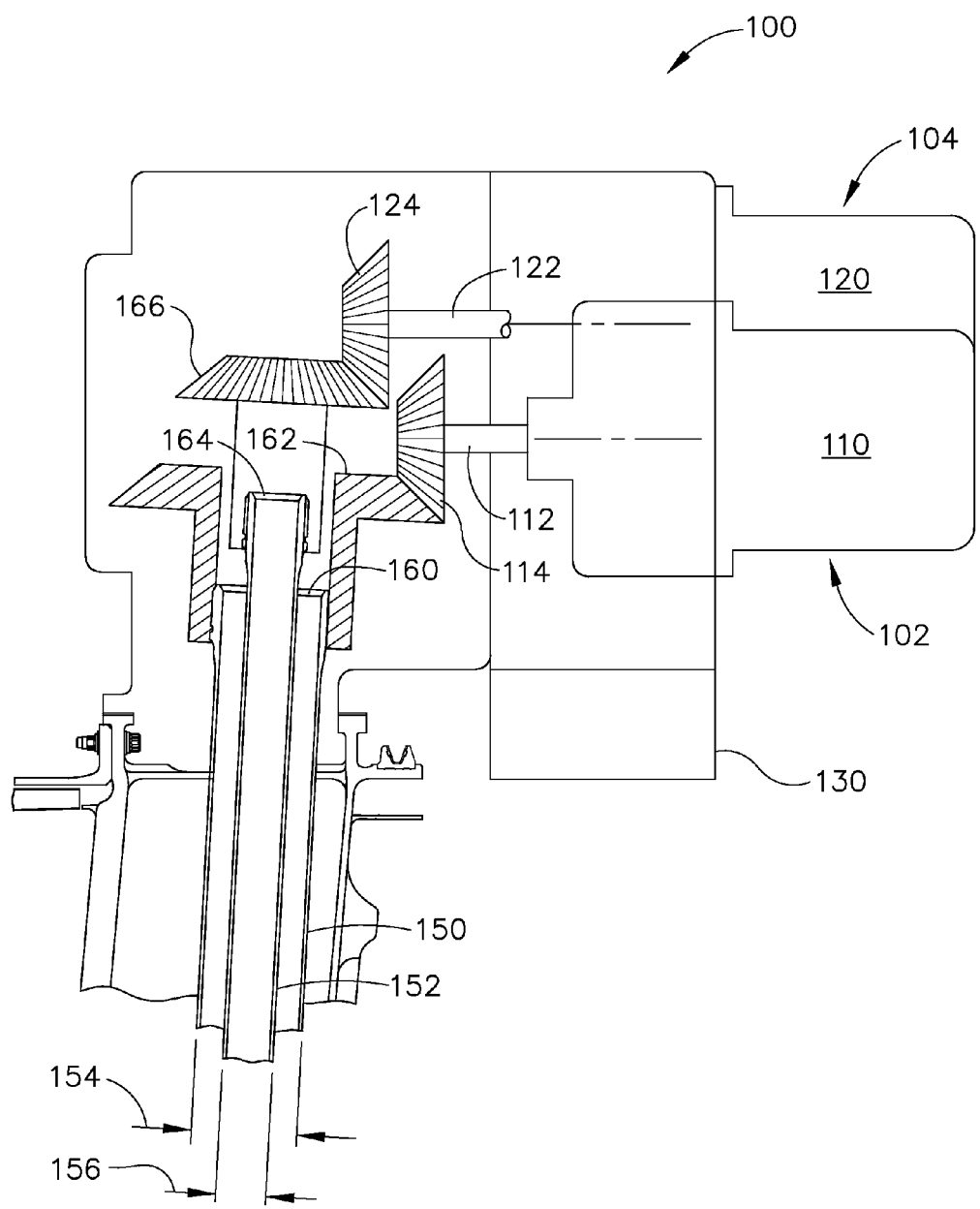
FIG. 3 is a cross-sectional view of a radially outer portion of the starter/generator system shown in FIGS. 1 and 2.

FIG. 3 is a cross-sectional view of a radially outer portion of starter/generator system 100 shown in FIGS. 1 and 2. In the exemplary embodiment, starter 102 includes motor/generator 110, a motor shaft 112 that is coupled to, and driven by motor/generator 110, and a drive pinion 114 that is coupled to drive shaft 112. Generator 104 includes generator/motor 120, a generator shaft 122 that is coupled to, and driven by generator/motor 120, and a drive pinion 124 that is coupled to drive shaft 122. In the exemplary embodiment, motor/generator 110 and generator/motor 120 are each coupled to accessory gearbox 130 that is coupled to core gas turbine engine 13.

Starter/generator system 100 also includes first drive shaft 150 that is coupled to motor/generator 110 and a second drive shaft 152 that is coupled to generator/motor 120. First drive shaft 150 has an inside diameter 154 and second drive 152 has an outside diameter 156. In the exemplary embodiment, outside diameter 156 is less than inside diameter 154 such that first drive shaft 150 substantially circumscribes second drive shaft 152. Specifically, second drive shaft 152 has an outside diameter 156 that is less than the inside diameter 154 of first drive shaft 150 such that second drive shaft 152 may be positioned inside first drive shaft 150.

First drive shaft 150 includes a first end 160 and a pinion 162 that is coupled to first end 160. In the exemplary embodiment, drive pinion 114 and pinion 162 are each bevel gears configured such that drive pinion 114 is intermeshed with pinion 162 and such that rotating drive pinion 114 causes pinion 162 to rotate. Second drive shaft 152 includes a first end 164 and a pinion 166 that is coupled to first end 164. In the exemplary embodiment, drive pinion 124 and pinion 166 are each bevel gears configured such that drive pinion 124 is intermeshed with pinion 166 and such that rotating drive pinion 124 causes pinion 166 to rotate.

Figure 4:
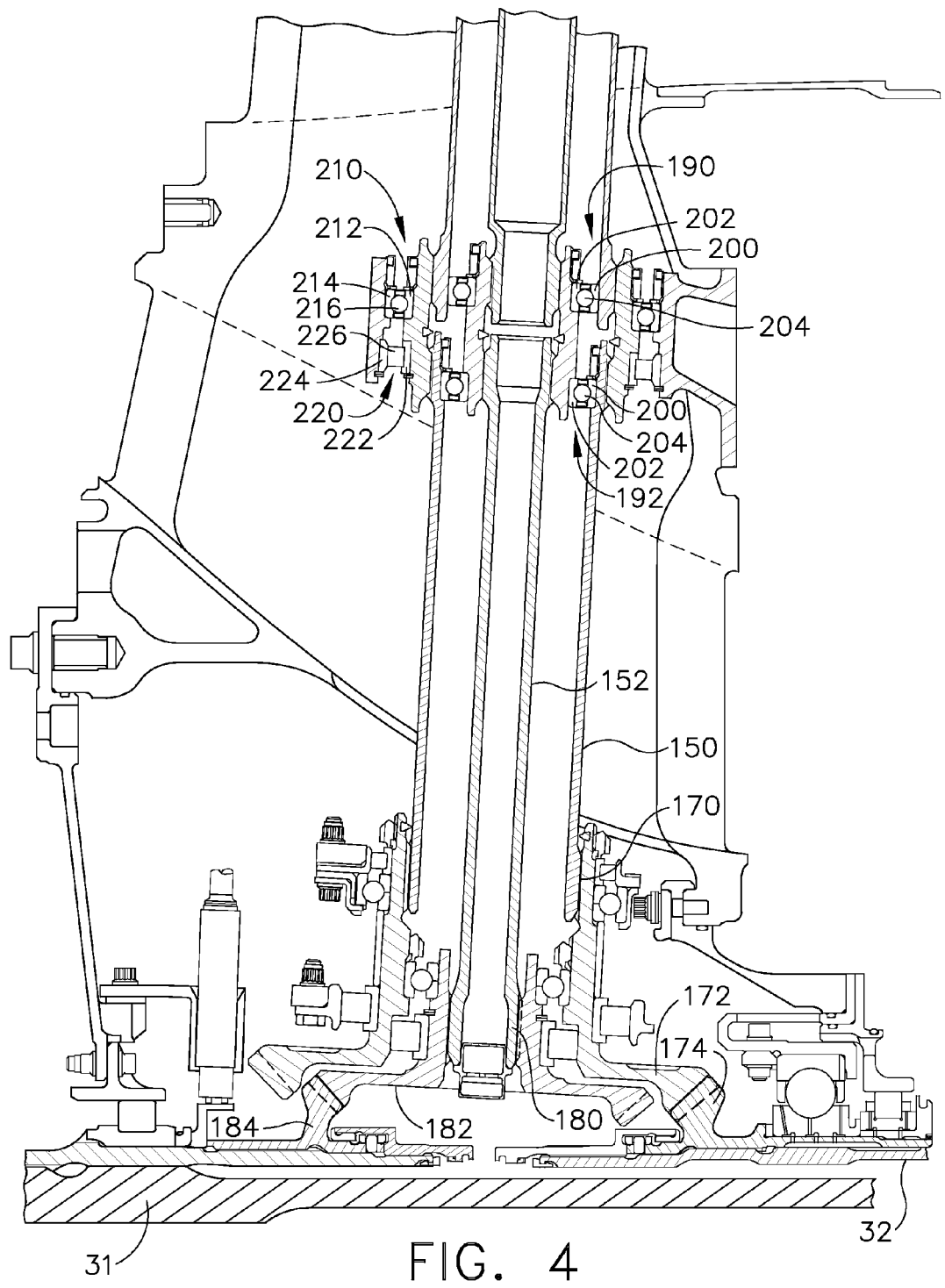
FIG. 4 is a cross-sectional view of a radially inner portion of the starter/generator system shown in FIGS. 1 and 2.
Figure 5:
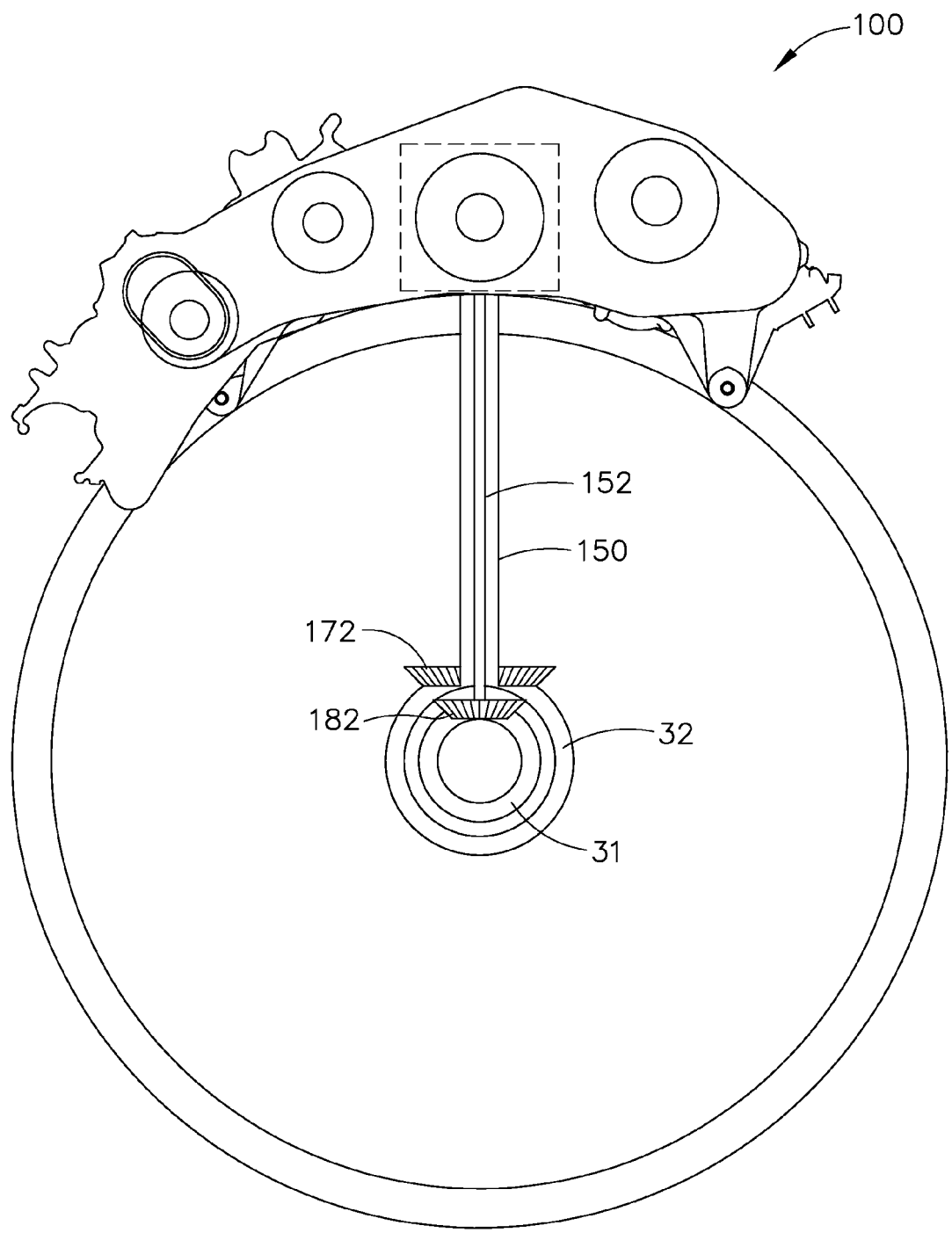
FIG. 5 is an end view of a portion of the starter generator system shown in FIGS. 3 and 4.

FIG. 4 is a cross-sectional view of a radially inner portion of starter/generator system 100 shown in FIGS. 1, 2, and 3. FIG. 5 is an end view of the radially inner portion of starter/generator system 100 shown in FIG. 4.

In the exemplary embodiment, first drive shaft 150 also includes a second end 170 and a pinion 172 that is coupled or splined to second end 170. Moreover, gas turbine engine assembly 10 also includes a ring gear 174 that is coupled or splined to second rotor shaft 32. In the exemplary embodiment, pinion 172 and ring gear 174 are each bevel gears configured such that pinion 172 is intermeshed with ring gear 174 and such that rotating shaft 32 causes ring gear 174 to rotate and thus causes pinion 172 to rotate. Second drive shaft 152 also includes a second end 180 and a pinion 182 that is coupled or splined to second end 180. Moreover, gas turbine engine assembly 10 also includes a ring gear 184 that is coupled or splined to first rotor shaft 31. In the exemplary embodiment, pinion 182 and ring gear 184 are each bevel gears configured such that pinion 182 is intermeshed with ring gear 184 and such that rotating shaft 31 causes ring gear 184 to rotate and thus causes pinion 182 to rotate. As shown in FIGS. 3 and 4, shafts 150 and 152 may be fabricated to include one or more shaft portions that are coupled together to form a single respective shaft, and thus simplify assembly. Optionally, shafts 150 and 152 may also be fabricated as unitary components without affecting the scope of the invention described herein.

As shown in FIG. 4, starter generator system 100 also includes a plurality of bearing assemblies to facilitate maintaining shafts 150 and 152 in the proper position within gas turbine engine assembly 10. Specifically, starter/generator system 100 includes a first differential bearing 190 and a second differential bearing 192 that are each coupled between shafts 150 and 152. Although, the invention described herein is described with respect to a pair of differential bearings 190 and 192, it should be realized that a single differential bearing 190 may be utilized when shafts 150 and 152 are fabricated as unitary components. Differential bearings 190 and 192 each include a rotating outer race 200 that is secured to shaft 150 and a rotating inner race 202 that is secured to shaft 152. Each differential bearing 190 and 192 also includes a plurality of rolling elements 204 that are positioned between outer and inner races 200 and 202 respectively. Differential bearings 190 and 192 each facilitate maintaining shaft 152 in a substantially fixed orientation with respect to shaft 150, while allowing shaft 152 to rotate independently from shaft 150.

Starter/generator system 100 includes a third bearing 210 that is coupled between shaft 150 and a structural component of gas turbine engine assembly 10 to support shaft 150 while still allowing shaft 150 to rotate with respect of the structural component. Third bearing 210 includes a rotating inner race 212 that is coupled to shaft 150, a stationary outer race 214 that is secured to the structural component. Third bearing 210 also includes a plurality of rolling elements 216 that are positioned between inner and outer races 212 and 214 respectively.

Starter/generator system 100 includes a fourth bearing 220 that in the exemplary embodiment is a roller bearing configured to maintain shaft 150 in a substantially fixed orientation within gas turbine engine assembly 10. Fourth bearing 220 includes a rotating inner race 222 that is coupled to shaft 150, a stationary outer race 224 that is secured to the structural component, and a plurality of rolling elements 226 that are positioned between inner and outer races 222 and 224 respectively.

During assembly, the starter 102 is coupled to the core gas turbine engine 13 and the generator 104 is coupled to the low-pressure turbine 20. Specifically, starter 102 and generator 104 are each coupled to the accessory gearbox 130. The second drive shaft 152 is inserted into the first drive shaft 150. The first drive shaft 150 is then coupled between the starter 102 and the core gas turbine engine 13, and the second drive shaft 152 is coupled between the generator 104 and the low-pressure turbine 20.

During operation, starter 102 is activated to start the core gas turbine engine 13. Specifically, activating starter 102 causes shaft 150 to rotate and thus causes the core gas turbine engine 13 to rotate and start as is known in the art. In the exemplary embodiment, starting the core gas turbine engine 13 causes the low-pressure turbine 20 to rotate, thus causing generator 104 to generate electrical energy. Additionally, during flight or other operations, generator 104 may be utilized to restart the gas turbine engine. Specifically, since generator 104 includes a generator/motor 120, supplying electrical power to generator 104 causes generator 104 to function as a starter. Specifically, since generator 104 is coupled to low-pressure turbine 20 via shaft 152, operating generator 104 as a motor causes shaft 152 to rotate the low-pressure turbine 20 and thus restart the gas turbine engine assembly 10. Moreover, during selected operating conditions, core gas turbine engine 13 may be utilized to drive starter 102 thus causing starter 102 to function as a generator to facilitate generating additional electrical energy that may be utilized by the aircraft to peak power load conditions. Specifically, gas turbine engine assembly 10 also includes a clutch 230 that is coupled between starter 102 and shaft 32 such that during selected operating conditions, clutch 230 may be disengaged such that shaft 32 drives starter 102 to produce electrical energy. For example, in the exemplary embodiment, clutch 230 is an overrunning clutch such that clutch 230 is engaged during engine startup. Optionally, a control signal is transmitted to clutch 230 when desired such that clutch 230 does not overrun and such that starter 102 functions as a generator to produce electrical energy.

Described herein is a gas turbine engine assembly that is configured to extract relatively large amounts of power from the engine while operating the engine at low thrust conditions. The starter/generator system described herein is configured to extract power from both the core gas turbine engine and the low-pressure turbine simultaneously in order to share the load requirements. For example, during ground start, the starter engages the high-pressure compressor, thus rotating the high-pressure compressor in order to establish airflow in the core gas turbine engine before lighting the combustor. Optionally, during a windmill start, the generator, which is coupled to the low-pressure turbine, can produce power that is used to motor the high-pressure compressor to speed using its generator/starter-motor in order to achieve light off of the combustor.

As a result, additional energy is extracted from the low-pressure turbine and fan assembly to support ever increasing electrical demands. Specifically, newer aircraft are designed to require an atypically large amount of electrical power driven by the generator on the engine accessory gearbox. The power requirements during idle conditions thus require the engine to run at idle speeds that are higher than desirable in order to maintain adequate compressor stall margin. This results in thrust levels for the engine that are higher than desired for both flight idle descent points and ground idle conditions, which has both maintenance cost implications for aircraft brakes and excess fuel burn penalties for typical short range missions.

Whereas the system described herein, takes power off both shafts simultaneously in order to share the load requirements. As a result, the system described herein is relatively simple to install, and also provides a low weight solution to this problem. Moreover, the system described herein, allows for reduced thrust during ground idle conditions to reduce aircraft brake maintenance, reduced dirt ingestion, and reduced flight idle thrusts for an improved flight profile and improved short range fuel burn while still maintaining adequate compressor stall margin during high power extraction conditions.

While the invention has been described in terms of various specific embodiments, those skilled in the art will recognize that the invention can be practiced with modification within the spirit and scope of the claims.

What is claimed is:

1. A method for assembling a gas turbine engine assembly including a core gas turbine engine, a low-pressure turbine, a starter, and a generator, said method comprising:
   coupling a starter to the core gas turbine engine using a first drive shaft and a first rotor shaft that is coupled to the first drive shaft, wherein the starter is coupled to the first drive shaft by a first pinion, and wherein the starter comprises a motor/generator that is configured to rotate the core gas turbine engine when operating in a first mode and to generate electrical energy when operating in a second mode;
   coupling a clutch between the starter and the core gas turbine engine, wherein the clutch is engaged in the first mode and disengaged in the second mode;
   inserting a second drive shaft into the first drive shaft;
   inserting a second rotor shaft into the first rotor shaft; and
   coupling a generator to the low-pressure turbine using the second drive shaft and the second rotor shaft, wherein the generator is coupled to the second drive shaft by a second pinion that is substantially coaxial with the first pinion,
   where a rotation of the generator is independent of a rotation of the first drive shaft.

2. A method in accordance with claim 1, further comprising:
   coupling the starter to an accessory gearbox mounted on the core gas turbine engine; and
   coupling the generator to the accessory gearbox.

3. A method in accordance with claim 1, further comprising:
   coupling a differential bearing between the first and second drive shafts.

4. A method in accordance with claim 1, further comprising:
   coupling a first ring gear to the core gas turbine engine;
   coupling a first drive pinion to the first drive shaft such that the first drive pinion is intermeshed with the first ring gear and such that actuating the starter causes the core gas turbine engine to rotate;
   coupling a second ring gear to the low-pressure turbine; and
   coupling a second drive pinion to the second drive shaft such that the second drive pinion is intermeshed with the second ring gear and such that rotating the low-pressure turbine causes the generator to rotate.

5. A starter/generator system for a gas turbine engine, the gas turbine engine including a core gas turbine engine and a low-pressure turbine coupled to the core gas turbine engine, said starter/generator system comprising:
   a first drive shaft coupled to the core gas turbine engine by a first rotor shaft;
   a second drive shaft coupled to the low-pressure turbine by a second rotor shaft positioned within the first rotor shaft, said first drive shaft circumferentially surrounds said second drive shaft;
   a starter coupled to said core gas turbine engine by said first drive shaft, wherein the starter is coupled to said first drive shaft by a first pinion, and wherein said starter comprises a motor/generator that is configured to rotate the core gas turbine engine when operating in a first mode and to generate electrical energy when operating in a second mode;
   a clutch coupled between said starter and said core gas turbine engine, said clutch configured to be engaged in the first mode and disengaged in the second mode; and
   a generator coupled to said low-pressure turbine by said second drive shaft, wherein said generator is coupled to said second drive shaft by a second pinion that is substantially coaxial with said first pinion,
   where a rotation of the generator is independent of a rotation of the first drive shaft.

6. A starter/generator system in accordance with claim 5, further comprising a differential bearing coupled between said first and second drive shafts.

7. A starter/generator system in accordance with claim 5, further comprising:
   a ring gear coupled to said core gas turbine engine; and
   a drive pinion coupled to said first drive shaft, said drive pinion intermeshed with said ring gear such that actuating said starter causes said core gas turbine engine to rotate.

8. A starter/generator system in accordance with claim 5, further comprising:
   a ring gear coupled to said low-pressure turbine; and
   a drive pinion coupled to said second shaft, said drive pinion intermeshed with said ring gear such that rotating said low-pressure turbine causes said generator to rotate.

9. A starter/generator system in accordance with claim 5, wherein said generator comprises a motor/generator that is coupled to said second drive shaft, said motor/generator configured to generate electrical energy when operating in a first mode and to rotate said low-pressure turbine when operating in a second mode.

10. A gas turbine engine assembly comprising:
   a core gas turbine engine;
   a low-pressure turbine;
   a first rotor shaft coupled to said core gas turbine engine;
   a second rotor shaft coupled to said low-pressure turbine, wherein said second rotor shaft is positioned within said first rotor shaft; and
   a starter/generator system comprising:
   a first drive shaft coupled to said core gas turbine engine by said first rotor shaft;
   a second drive shaft coupled to said low-pressure turbine by said second rotor shaft, said first drive shaft circumferentially surrounds said second drive shaft;
   a starter coupled to said core gas turbine engine by said first drive shaft, wherein said starter is coupled to said first drive shaft by a first pinion, and wherein said starter comprises a motor/generator that is configured to rotate said core gas turbine engine when operating in a first mode and to generate electrical energy when operating in a second mode;
   a clutch coupled between said starter and said core gas turbine engine, said clutch configured to be engaged in the first mode and disengaged in the second mode; and
   a generator coupled to said low-pressure turbine by said second drive shaft, wherein said generator is coupled to said second drive shaft by a second pinion that is substantially coaxial with said first pinion,
where a rotation of the generator is independent of a rotation of the first drive shaft.

11. A gas turbine engine assembly in accordance with claim 10, further comprising a fan assembly coupled to said low-pressure turbine.

12. A gas turbine engine assembly in accordance with claim 10, further comprising a differential bearing coupled between said first and second drive shafts.

13. A gas turbine engine assembly in accordance with claim 10, further comprising:
a ring gear coupled to said core gas turbine engine; and
a drive pinion coupled to said first drive shaft, said drive pinion intermeshed with said ring gear such that actuating said starter causes said core gas turbine engine to rotate.

14. A gas turbine engine assembly in accordance with claim 10, further comprising:
a ring gear coupled to said low-pressure turbine; and
a drive pinion coupled to said second shaft, said drive pinion intermeshed with said ring gear such that rotating said low-pressure turbine causes said generator to rotate.

15. A gas turbine engine assembly in accordance with claim 10, wherein said generator comprises a motor/generator that is coupled to said second drive shaft, said motor/generator configured to generate electrical energy when operating in a first mode and to rotate said low-pressure turbine when operating in a second mode.

16. A gas turbine engine assembly in accordance with claim 10 wherein said clutch comprises an overrunning clutch such that said clutch is engaged during a startup of said core gas turbine engine.

* * * * *